(12) United States Patent
Jiang et al.

(10) Patent No.: US 11,599,982 B2
(45) Date of Patent: Mar. 7, 2023

(54) SYSTEMS AND METHODS FOR IMAGE PROCESSING

(71) Applicant: SHANGHAI UNITED IMAGING HEALTHCARE CO., LTD., Shanghai (CN)

(72) Inventors: Chunhua Jiang, Shanghai (CN); Shurui Zhao, Shanghai (CN); Hanyu Wang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 172 days.

(21) Appl. No.: 17/105,654

(22) Filed: Nov. 27, 2020

(65) Prior Publication Data

US 2021/0090228 A1   Mar. 25, 2021

Related U.S. Application Data

(63) Continuation of application No. PCT/CN2019/089386, filed on May 30, 2019.

(30) Foreign Application Priority Data

May 30, 2018 (CN) .......................... 201810540416.0

(51) Int. Cl.
*G06T 5/00* (2006.01)
*G06T 5/50* (2006.01)
*G06T 5/20* (2006.01)

(52) U.S. Cl.
CPC .............. *G06T 5/50* (2013.01); *G06T 5/002* (2013.01); *G06T 5/20* (2013.01); *G06T 2207/20028* (2013.01); *G06T 2207/20224* (2013.01)

(58) Field of Classification Search
CPC .. G06T 5/50; G06T 5/002; G06T 5/20; G06T 2207/20028; G06T 2207/20224;
(Continued)

(56) References Cited

U.S. PATENT DOCUMENTS 5,235,434 A * 8/1993 Wober ................... G06T 5/008
358/448
5,383,036 A * 1/1995 Mailloux ................. H04N 1/58
358/518
(Continued)

FOREIGN PATENT DOCUMENTS

| CN | 1819621 A | 8/2006 |
|---|---|---|
| CN | 101035300 A | 9/2007 |

(Continued)

OTHER PUBLICATIONS

The Second Office Action in Chinese Application No. 201810540416.0 dated Jul. 2, 2021, 19 pages.
(Continued)

*Primary Examiner* — Jose L Couso
(74) *Attorney, Agent, or Firm* — Metis IP LLC

(57) ABSTRACT

The present disclosure relates to systems and methods for image processing. The method may include receiving an original image including a plurality of pixels; determining a plurality of smoothed images by applying a plurality of filtering kernels to the plurality of pixels of the original image, wherein each of the plurality of filtering kernels may be associated with a respective kernel size; determining a plurality of enhanced images by comparing the original image with the plurality of smoothed images; and generating a target image based on at least one of the plurality of enhanced images and at least one of: the original image or at least one of the plurality of smoothed images.

17 Claims, 12 Drawing Sheets

(58) Field of Classification Search
CPC . G06T 2207/20016; G06T 2207/20024; G06T 2207/30068; G06T 5/004; G06T 2207/20012; G06T 5/00; G06T 5/001; G06T 5/003; G06T 5/005; G06T 5/006; G06T 5/007; G06T 5/008; G06T 5/009; G06T 2207/10004; G06T 2207/10016; G06T 2207/10024; G06T 2207/20172; G06T 2207/20192; G06T 2207/20201; H04N 5/235; H04N 1/409; H04N 1/4092; H04N 1/58; H04N 5/325; H04N 9/646; G06K 15/1872

See application file for complete search history.

(56) References Cited

U.S. PATENT DOCUMENTS

| | | | | |
|---|---|---|---|---|
| 5,424,783 | A * | 6/1995 | Wong | G06T 5/20 382/254 |
| 6,072,913 | A | 6/2000 | Yamada | |
| 6,990,249 | B2 * | 1/2006 | Nomura | H04N 1/00135 348/580 |
| 9,076,205 | B2 | 7/2015 | Cho et al. | |
| 10,380,753 | B1 * | 8/2019 | Csordás | G06V 10/82 |
| 2001/0038712 | A1 * | 11/2001 | Loce | H04N 1/409 382/209 |
| 2002/0114530 | A1 * | 8/2002 | Duarte | G06T 5/001 382/254 |
| 2005/0018894 | A1 * | 1/2005 | Couwenhoven | G06T 5/004 382/260 |
| 2008/0025622 | A1 * | 1/2008 | Hanamoto | G06T 3/4007 382/235 |
| 2008/0239090 | A1 * | 10/2008 | Ohwaki | G06T 5/004 348/222.1 |
| 2010/0061650 | A1 * | 3/2010 | Rai | G06T 5/20 382/264 |
| 2010/0150472 | A1 * | 6/2010 | Chen | G02B 21/008 382/278 |
| 2012/0045095 | A1 * | 2/2012 | Tate | G06T 7/75 382/103 |
| 2014/0010472 | A1 | 1/2014 | Xu | |
| 2014/0140626 | A1 * | 5/2014 | Cho | G06T 5/003 382/199 |
| 2016/0005155 | A1 * | 1/2016 | Sato | H04N 19/132 382/263 |
| 2016/0012312 | A1 * | 1/2016 | Ishii | G06V 10/752 382/209 |
| 2016/0171341 | A1 * | 6/2016 | Jeon | G06T 7/75 382/128 |
| 2016/0335475 | A1 * | 11/2016 | Krenzer | G06V 10/469 |

FOREIGN PATENT DOCUMENTS

| | | | | |
|---|---|---|---|---|
| CN | 103226808 | A | 7/2013 | |
| CN | 104103037 | A | 10/2014 | |
| CN | 104103040 | A | 10/2014 | |
| CN | 107464229 | A | 12/2017 | |
| WO | WO-9701152 | A1 * | 1/1997 | G06T 5/20 |
| WO | 2019228481 | A1 | 12/2019 | |

OTHER PUBLICATIONS

The Extended European Search Report in European Application No. 19811990.1 dated Jul. 13, 2021, 8 pages.
Chen, Xiaoming et al., A Compositive Contrast Enhancement Algorithm of IR Image, 2013 International Conference on Information Technology and Applications, 2013, 5 pages.
Fleming Yuan Ming Lure et al., Multiresolution Unsharp Masking Technique for Mammogram image Enhancement, Proceedings of SPIE, 1996, 11 pages.
Priyadharsini Ravisankar et al., Acoustic Image Enhancement Using Gaussian and Laplacian Pyramid—A Multiresolution Based Technique, Multimedia Tools and Applications, 77(5): 5547-5561, 2018.
International Search Report in PCT/CN2019/089386 dated Aug. 29, 2019, 4 Pages.
Written Opinion in PCT/CN2019/089386 dated Aug. 29, 2019, 5 Pages.
Yu, Chaohui et al., Gray Equilibrium, Visual C++ Digital Image Processing and Engineering Application Practice, 2012, p. 98.

* cited by examiner

800

┌─────────────────────────────────────────────────────────┐
│ Determining at least two filtering kernels of different kernel sizes, │
│ wherein the at least two filtering kernels of different kernel sizes │ ~ 802
│ correspond to different features of an original image under different │
│ scale sizes │
└─────────────────────────────────────────────────────────┘
                              ↓
┌─────────────────────────────────────────────────────────┐
│ Processing the original image using the at least two filtering kernels │
│ of different kernel sizes and generating a smoothed image and an │ ~ 804
│ enhanced image corresponding to each of the at least two filtering │
│ kernels │
└─────────────────────────────────────────────────────────┘
                              ↓
┌─────────────────────────────────────────────────────────┐
│ Comparing the kernel sizes of the at least two filtering kernels and │
│ determining a smoothed image corresponding to a filtering kernel of │ ~ 806
│ a maximum kernel size as a selected smoothed image │
└─────────────────────────────────────────────────────────┘
                              ↓
┌─────────────────────────────────────────────────────────┐
│ Performing a gray equalization on the selected smoothed image │ ~ 808
└─────────────────────────────────────────────────────────┘
                              ↓
┌─────────────────────────────────────────────────────────┐
│ Generating the target image by reconstructing the equalized │ ~ 810
│ smoothed image and the enhanced images │
└─────────────────────────────────────────────────────────┘

FIG. 8

SYSTEMS AND METHODS FOR IMAGE PROCESSING

CROSS-REFERENCE TO RELATED APPLICATIONS

This application is a continuation of International Application No. PCT/CN2019/089386 filed on May 30, 2019, which claims priority to Chinese Patent Application No. 201810540416.0, filed on May 30, 2018, the contents of which are incorporated herein by reference in their entirety.

TECHNICAL FIELD

The present disclosure generally relates to image processing, and in particular, to systems and methods for image enhancing.

BACKGROUND

Images usually contain a plurality of features, which can provide significant reference information in various fields (e.g., medical field). However, images obtained based on existing imaging techniques usually include blur or noise, which may influence image quality and subsequent application (e.g., medical diagnosis). Therefore, image enhancement becomes increasingly important for image processing research. Generally, an image includes a plurality of features under different scale sizes. Accordingly, it is desirable to provide systems and methods for image enhancement for features under different scale sizes.

SUMMARY

A first aspect of the present disclosure relates to an image enhancement method. The method may include determining at least two filtering kernels of different kernel sizes, wherein the at least two filtering kernels of different kernel sizes may correspond to different features of an original image under different scale sizes; processing the original image using the at least two filtering kernels of different kernel sizes to generate a smoothed image and an enhanced image corresponding to each of the at least two filtering kernels of different kernel sizes; and selecting the original image and/or a smoothed image and generating a target image by reconstructing the enhanced images, the selected original image and/or the smoothed image.

In some embodiments, the processing the original image using the at least two filtering kernels of different kernel sizes to generate the smoothed image and the enhanced image corresponding to each of the at least two filtering kernels of different kernel sizes may include processing the original image using the at least two filtering kernels of different kernel sizes to generate at least two corresponding smoothed images; performing a difference operation on the original image and each of the at least two smoothed images pixel by pixel to generate a processed image corresponding to each of the at least two filtering kernels; and enhancing the processed image to obtain an enhanced image.

In some embodiments, the enhancing the processed image to obtain the enhanced image may include determining an image enhancement curve for the processed image based on a kernel size of a filtering kernel corresponding to the processed image, wherein the image enhancement curve may be associated with intensities of pixels in the processed image; enhancing the processed image based on the image enhancement curve to obtain an enhanced processed image; and combining the enhanced processed image with the processed image to generate the enhanced image.

In some embodiments, the filtering kernel may be one of a mean filtering kernel or a bilateral filtering kernel.

In some embodiments, the method may further include selecting the smoothed images. The selecting the smoothed images may include comparing the kernel sizes of the at least two filtering kernels and determining a smoothed image corresponding to a filtering kernel of a maximum kernel size as the selected smoothed image.

In some embodiments, before reconstructing the enhanced images and the selected original image and/or the selected smoothed image, the method may further include performing a gray equalization on the selected smoothed image.

A second aspect of the present disclosure relates to an image enhancement device. The image enhancement device may include a filtering kernel determination module, an image processing module, and an image reconstruction module. The filtering kernel determination module may be configured to determine at least two filtering kernels of different kernel sizes, wherein the at least two filtering kernels of different kernel sizes may correspond to different features of an original image under different scale sizes. The image processing module may be configured to process the original image using the at least two filtering kernels of different kernel sizes to generate a smoothed image and an enhanced image corresponding each of the at least two filtering kernels of different kernel sizes. The image reconstruction module may be configured to select the original image and/or a smoothed image and generate a target image by reconstructing the enhanced images and the selected original image and/or the smoothed image.

In some embodiments, the image processing module may include a smoothed image generation sub-module, a processed image generation sub-module, and an enhanced image generation sub-module. The smoothed image generation sub-module may be configured to process the original image using the at least two filtering kernels of different kernel sizes to generate at least two corresponding smoothed images. The processed image generation sub-module may be configured to perform a difference operation on the original image and each of the smoothed images pixel by pixel and generate a processed image corresponding to each of the at least two filtering kernels. The enhanced image generation sub-module may be configured to enhance each processed image to generate an enhanced image corresponding to each of the at least two filtering kernels.

A third aspect of the present disclosure relates to an image enhancement device. The image enhancement device may include one or more processors and a storage device. The storage device may be configured to store one or more programs, wherein when the one or more programs are executed by the one or more processors, the one or more programs may direct the one or more processors to execute the image enhancement method.

A fourth aspect of the present disclosure relates to a computer readable storage medium. The computer readable storage medium may store computer instructions, wherein when the computer instructions are executed by a computer, the computer may execute the image enhancement method.

A fifth aspect of the present disclosure relates to a method for image processing. The method may be implemented on a computing device including a processor and a storage. The method may include receiving an original image including a plurality of pixels; determining a plurality of smoothed images by applying a plurality of filtering kernels to the plurality of pixels of the original image, wherein each of the plurality of filtering kernels may be associated with a respective kernel size; determining a plurality of enhanced images by comparing the original image with the plurality of smoothed images; and generating a target image based on at least one of the plurality of enhanced images and at least one of: the original image or at least one of the plurality of smoothed images.

In some embodiments, each of the plurality of filtering kernels may include a respective kernel size determined based on a scale size of a respective one of a plurality of features of the original image.

In some embodiments, each of the plurality of filtering kernels may be one of a mean filtering kernel or a bilateral filtering kernel.

In some embodiments, the determining the plurality of smoothed images by applying the plurality of filtering kernels to the plurality of pixels of the original image may include performing a plurality of low-pass filtering operations on the original image based on the plurality of filtering kernels.

In some embodiments, the determining the plurality of enhanced images by comparing the original image with the plurality of smoothed images may include for each of the plurality of smoothed images, determining an intermediate image by subtracting the smoothed image from the original image; and determining a corresponding enhanced image by processing the intermediate image.

In some embodiments, the determining the corresponding enhanced image by processing the intermediate image may include determining an image enhancement curve based on a filtering kernel used to determine the intermediate image, wherein the image enhancement curve may be associated with intensities of pixels in the intermediate image; processing the intermediate image based on the image enhancement curve; and determining the corresponding enhanced image by combining the intermediate image and the processed intermediate image.

In some embodiments, the generating the target image based on at least one of the plurality of enhanced images and at least one of the original image or at least one of the plurality of smoothed images may include selecting a smoothed image corresponding to a filtering kernel with a maximum size; and generating the target image based on at least one of the plurality of enhanced images and the selected smoothed image.

In some embodiments, the generating the target image based on the plurality of second processed images and at least one of the original image or the plurality of intermediate images may include performing a gray equalization on the at least one of the original image or the plurality of smoothed images; and generating the target image based on the at least one of the plurality of enhanced images and the equalized at least one of the original image or at least one of the plurality of smoothed images.

A sixth aspect of the present disclosure relates to a system for image processing. The system may include a storage medium and a processor. The storage medium may store a set of instructions. The processor may be communicatively coupled to the storage medium and to execute the set of instructions to receive an original image including a plurality of pixels; determine a plurality of smoothed images by applying a plurality of filtering kernels to the plurality of pixels of the original image, wherein each of the plurality of filtering kernels may be associated with a respective kernel size; determine a plurality of enhanced images by comparing the original image with the plurality of smoothed images; and generate a target image based on at least one of the plurality of enhanced images and at least one of: the original image or at least one of the plurality of smoothed images.

In some embodiments, each of the plurality of filtering kernels may include a respective kernel size determined based on a scale size of a respective one of a plurality of features of the original image.

In some embodiments, each of the plurality of filtering kernels may be one of a mean filtering kernel or a bilateral filtering kernel.

In some embodiments, to determine the plurality of smoothed images by applying the plurality of filtering kernels to the plurality of pixels of the original image, the processor may perform a plurality of low-pass filtering operations on the original image based on the plurality of filtering kernels.

In some embodiments, to determine the plurality of enhanced images by comparing the original image with the plurality of smoothed images, the processor may, for each of the plurality of smoothed images, determine an intermediate image by subtracting the smoothed image from the original image and determine a corresponding enhanced image by processing the intermediate image.

In some embodiments, to determine the corresponding enhanced image by processing the intermediate image, the processor may determine an image enhancement curve based on a filtering kernel used to determine the intermediate image, wherein the image enhancement curve may be associated with intensities of pixels in the intermediate image. The processor may process the intermediate image based on the image enhancement curve. The processor may determine the corresponding enhanced image by combining the intermediate image and the processed intermediate image.

In some embodiments, to generate the target image based on at least one of the plurality of enhanced images and at least one of the original image or at least one of the plurality of smoothed images, the processor may select a smoothed image corresponding to a filtering kernel with a maximum size. The processor may generate the target image based on at least one of the plurality of enhanced images and the selected smoothed image.

In some embodiments, to generate the target image based on the plurality of second processed images and at least one of the original image or the plurality of intermediate images, the processor may perform a gray equalization on the at least one of the original image or at least one of the plurality of smoothed images. The processor may generate the target image based on the at least one of the plurality of enhanced images and the equalized at least one of the original image or at least one of the plurality of smoothed images.

A seventh aspect of the present disclosure relates to a system for image processing. The system may include an obtaining module, a smoothed image determination module, an enhanced image determination module, and a target image determination module. The obtaining module may be configured to receive an original image including a plurality of pixels. The smoothed image determination module may be configured to determine a plurality of smoothed images by applying a plurality of filtering kernels to the plurality of pixels of the original image, wherein each of the plurality of filtering kernels may be associated with a respective kernel size. The enhanced image determination module may be configured to determine a plurality of enhanced images by comparing the original image with the plurality of smoothed images. The target image determination module may be configured to generate a target image based on at least one of the plurality of enhanced images and at least one of: the original image or at least one of the plurality of smoothed images.

In some embodiments, each of the plurality of filtering kernels may include a respective kernel size determined based on a scale size of a respective one of a plurality of features of the original image.

In some embodiments, each of the plurality of filtering kernels may be one of a mean filtering kernel or a bilateral filtering kernel.

In some embodiments, to determine the plurality of smoothed images by applying the plurality of filtering kernels to the plurality of pixels of the original image, the smoothed image determination module may be further configured to perform a plurality of low-pass filtering operations on the original image based on the plurality of filtering kernels.

In some embodiments, to determine the plurality of enhanced images by comparing the original image with the plurality of smoothed images, the enhanced image determination module may be further configured to, for each of the plurality of smoothed images, determine an intermediate image by subtracting the smoothed image from the original image and determine a corresponding enhanced image by processing the intermediate image.

In some embodiments, to determine the corresponding enhanced image by processing the intermediate image, the enhanced image determination module may be further configured to determine an image enhancement curve based on a filtering kernel used to determine the intermediate image, wherein the image enhancement curve may be associated with intensities of pixels in the intermediate image; process the intermediate image based on the image enhancement curve; and determine the corresponding enhanced image by combining the intermediate image and the processed intermediate image.

In some embodiments, to generate the target image based on at least one of the plurality of enhanced images and at least one of the original image or at least one of the plurality of smoothed images, the target image determination module may be further configured to select a smoothed image corresponding to a filtering kernel with a maximum size and generate the target image based on at least one of the plurality of enhanced images and the selected smoothed image.

In some embodiments, to generate the target image based on the plurality of second processed images and at least one of the original image or the plurality of intermediate images, the target image determination module may be further configured to perform a gray equalization on the at least one of the original image or at least one of the plurality of smoothed images and generate the target image based on the at least one of the plurality of enhanced images and the equalized at least one of the original image or at least one of the plurality of smoothed images.

An eighth aspect of the present disclose relates to a non-transitory computer readable medium. The non-transitory computer readable medium may include executable instructions that, when executed by at least one processor, direct the at least one processor to perform a method. The method may include receiving an original image including a plurality of pixels; determining a plurality of smoothed images by applying a plurality of filtering kernels to the plurality of pixels of the original image, wherein each of the plurality of filtering kernels may be associated with a respective kernel size; determining a plurality of enhanced images by comparing the original image with the plurality of smoothed images; and generating a target image based on at least one of the plurality of enhanced images and at least one of: the original image or at least one of the plurality of smoothed images.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 8 is a flowchart illustrating an exemplary process for determining a target image according to some embodiments of the present disclosure;

DETAILED DESCRIPTION

Figure 1:
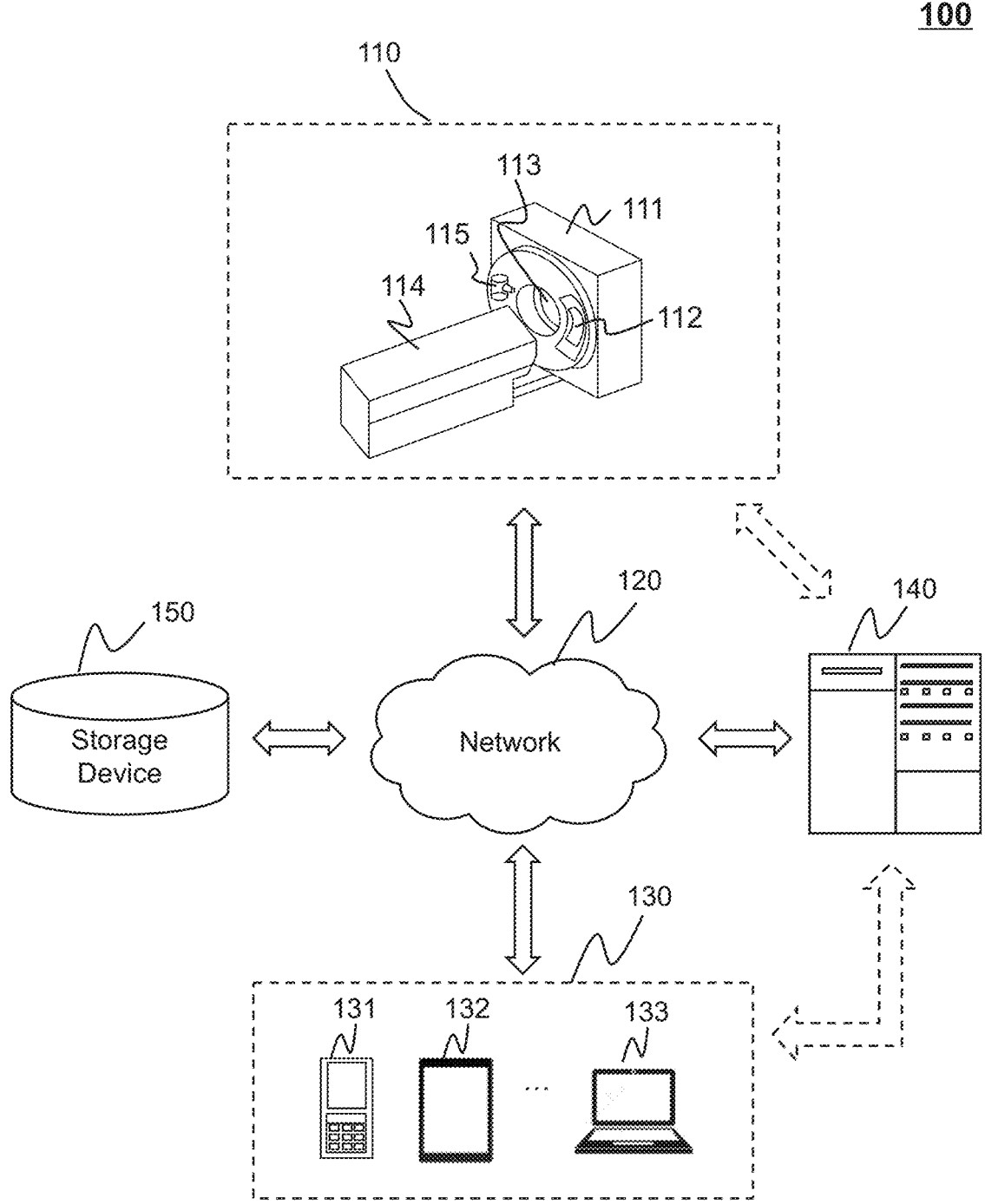
FIG. 1 is a schematic diagram illustrating an exemplary image processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assemblies of different levels in ascending order. However, the terms may be displaced by another expression if they achieve the same purpose.

Generally, the words "module," "unit," or "block" used herein refer to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for image processing. The system may receive an original image including a plurality of pixels. The system may determine a plurality of smoothed images by applying a plurality of filtering kernels to the plurality of pixels of the original image, wherein each of the plurality of filtering kernels is associated with a respective kernel size which is determined based on a scale size of a respective one of a plurality of features of the original image. Further, the system may determine a plurality of enhanced images by comparing the original image with the plurality of smoothed images. Still further, the system may generate a target image based on at least one of the plurality of enhanced images and at least one of the original image or at least one of the plurality of smoothed images. According to the systems and methods of the present disclosure, a plurality of filtering kernels with different kernel sizes are used and different features of the original image under different scale sizes can be enhanced, thereby improving image quality.

FIG. 1 is a schematic diagram illustrating an exemplary image processing system according to some embodiments of the present disclosure. As shown in FIG. 1, the image processing system 100 may include an imaging device 110, a network 120, a terminal device 130, a processing device 140, and a storage device 150. The components in the image processing system 100 may be connected in one or more of various ways. Merely byway of example, the imaging device 110 may be connected to the processing device 140 through the network 120. As another example, the imaging device 110 may be connected to the processing device 140 directly as indicated by the bi-directional arrow in dotted lines linking the imaging device 110 and the processing device 140. As still another example, the storage device 150 may be connected to the processing device 140 directly or through the network 120. As still another example, the terminal device 130 may be connected to the processing device 140 directly (as indicated by the bi-directional arrow in dotted lines linking the terminal device 130 and the processing device 140) or through the network 120.

The imaging device 110 may generate or provide image(s) via scanning an object or a part of the object. In some embodiments, the object to be scanned may include a body, substance, or the like, or any combination thereof. In some embodiments, the object may include a specific portion of a body, such as a head, a thorax, an abdomen, or the like, or any combination thereof. In some embodiments, the object may include a specific organ, such as a breast, an esophagus, a trachea, a bronchus, a stomach, a gallbladder, a small intestine, a colon, a bladder, a ureter, a uterus, a fallopian tube, etc. In the present disclosure, "object" and "subject" are used interchangeably. In some embodiments, the imaging device 110 may be a medical imaging device, for example, a computed tomography (CT) device, a magnetic resonance imaging (MRI) device, a positron emission tomography (PET) device, a single-photon emission computed tomography (SPECT) device, an ultrasonography device, an X-ray photography device, or the like, or any combination thereof. In some embodiments, the imaging device 110 may include a single-modality scanner or a multi-modality scanner. The single-modality scanner may include an MRI scanner, a CT scanner, a PET scanner, or the like, or any combination thereof. The multi-modality scanner may include a positron emission tomography-computed tomography (PET-CT) scanner, a positron emission tomography-magnetic resonance imaging (PET-MRI) scanner, or the like, or any combination thereof. In some embodiments, the imaging device may transmit the image(s) via the network 120 to the processing device 140, the storage device 150, and/or the terminal device 130. For example, the image(s) may be sent to the processing device 140 for further processing or may be stored in the storage device 150.

Take a CT scanner as an example, the CT scanner may include a gantry 111, a detector 112, a detecting region 113, a table 114, and a radioactive scanning source 115. The gantry 111 may support the detector 112 and the radioactive scanning source 115. The subject may be placed on the table 114 to be scanned. The radioactive scanning source 115 may emit radioactive rays to the subject. The detector 112 may detect radiation events (e.g., gamma photons) emitted from the detecting region 113. In some embodiments, the detector 112 may include one or more detector units. The detector units may include a scintillation detector (e.g., a cesium iodide detector), a gas detector, etc. The detector unit may be a single-row detector or a multi-rows detector.

The network 120 may include any suitable network that can facilitate exchange of information and/or data for the image processing system 100. In some embodiments, one or more components (e.g., the imaging device 110, the terminal device 130, the processing device 140, the storage device 150) of the image processing system 100 may communicate information and/or data with one or more other components of the image processing system 100 via the network 120. For example, the processing device 140 may obtain one or more instructions from the terminal device 130 via the network 120. As another example, the processing device 140 may obtain one or more images from the imaging device 110 or the storage device 150 via the network 120. The network 120 may be and/or include a public network (e.g., the Internet), a private network (e.g., a local area network (LAN), a wide area network (WAN))), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the image processing system 100 may be connected to the network 120 to exchange data and/or information.

The terminal device 130 may enable interactions between a user and the image processing system 100. The terminal device 130 may include a mobile device 131, a tablet computer 132, a laptop computer 133, or the like, or any combination thereof. In some embodiments, the mobile device 131 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal device 130 may be part of the processing device 140.

The processing device 140 may process data and/or information obtained from the imaging device 110, the terminal device 130, and/or the storage device 150. For example, the processing device 140 may obtain an original image from the imaging device 110 and determine a plurality of smoothed images based on the original image. As another example, the processing device 140 may determine a plurality of enhanced images by comparing the original image with the plurality of smoothed images. As still another example, the processing device 140 may generate a target image based on at least one of the plurality of enhances images and at least one of the original image or at least one of the plurality of smoothed images.

Figure 2:
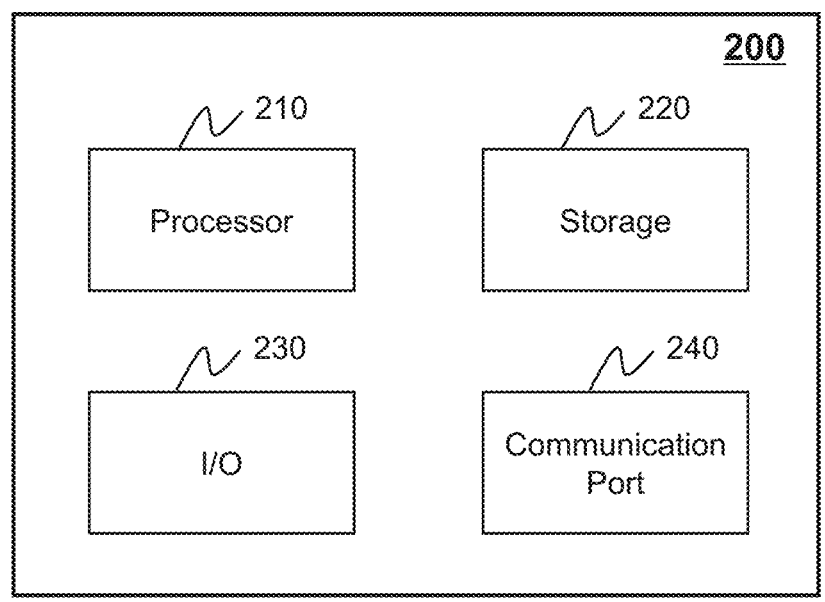
FIG. 2 is a schematic diagram illustrating exemplary hardware and/or software components of an exemplary computing device according to some embodiments of the present disclosure.

In some embodiments, the processing device 140 may be a computer, a user console, a single server or a server group, etc. The server group may be centralized or distributed. In some embodiments, the processing device 140 may be local or remote. For example, the processing device 140 may access information and/or data stored in the imaging device 110, the terminal device 130, and/or the storage device 150 via the network 120. As another example, the processing device 140 may be directly connected to the imaging device 110, the terminal device 130, and/or the storage device 150 to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented by a computing device 200 including one or more components as illustrated in FIG. 2.

The storage device 150 may store data, instructions, and/or any other information. In some embodiments, the storage device 150 may store data obtained from the imaging device 110, the terminal device 130, and/or the processing device 140. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components (e.g., the processing device 140, the terminal device 130) of the image processing system 100. One or more components in the image processing system 100 may access the data or instructions stored in the storage device 150 via the network 120. In some embodiments, the storage device 150 may be directly connected to or communicate with one or more other components (e.g., the processing device 140, the terminal device 130) of the image processing system 100. In some embodiments, the storage device 150 may be part of the processing device 140.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the imaging device 110 may be any image acquisition device (e.g., a camera, a scanner).

FIG. 2 is a schematic diagram illustrating exemplary hardware and/or software components of an exemplary computing device on which the processing device 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing device 140 in accordance with techniques described herein. The computer instructions may include, for example, routines, programs, objects, components, data structures, procedures, modules, and functions, which perform particular functions described herein. For example, the processor 210 may process image(s) obtained from the imaging device 110, the terminal device 130, the storage device 150, and/or any other component of the image processing system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the imaging device 110, the terminal device 130, the storage device 150, and/or any other component of the image processing system 100. In some embodiments, the storage 220 may include a mass storage device, a removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for positioning an object (or a table) and/or a program for guiding an operation of a medical instrument (e.g., a biopsy needle).

The I/O 230 may input and/or output signals, data, information, etc. In some embodiments, the I/O 230 may enable a user interaction with the processing device 140. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing device 140 and the imaging device 110, the terminal device 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
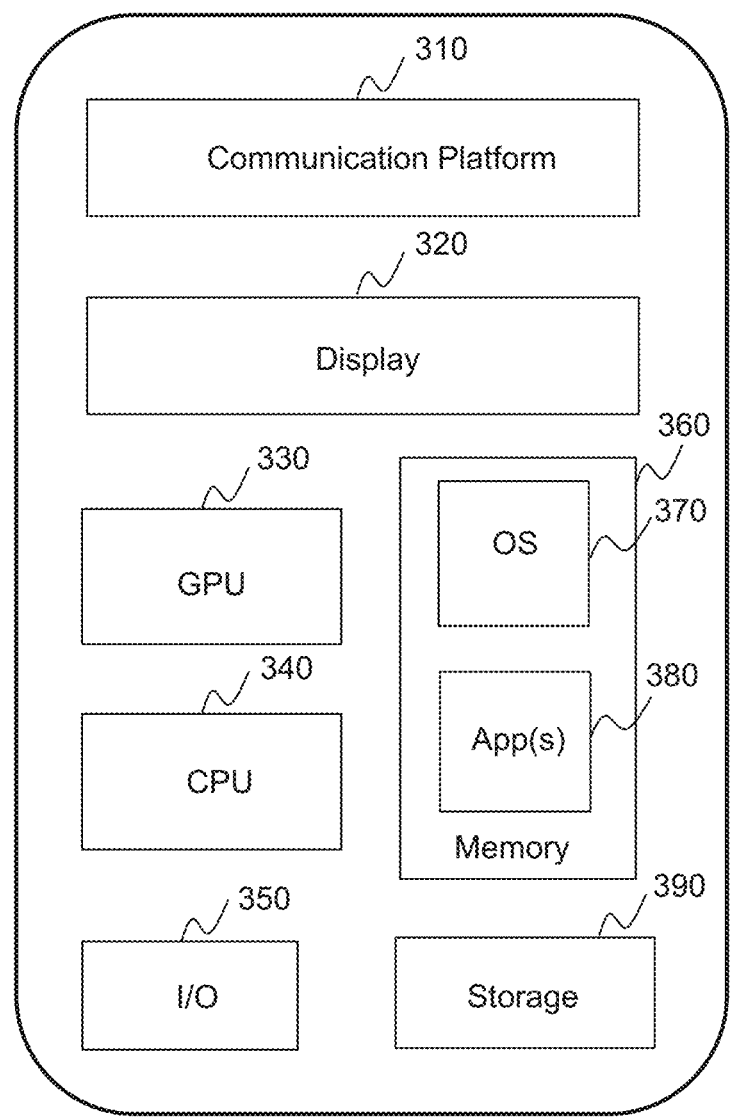
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device on which the terminal device 130 may be implemented according to some embodiments of the present disclosure. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the image processing system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
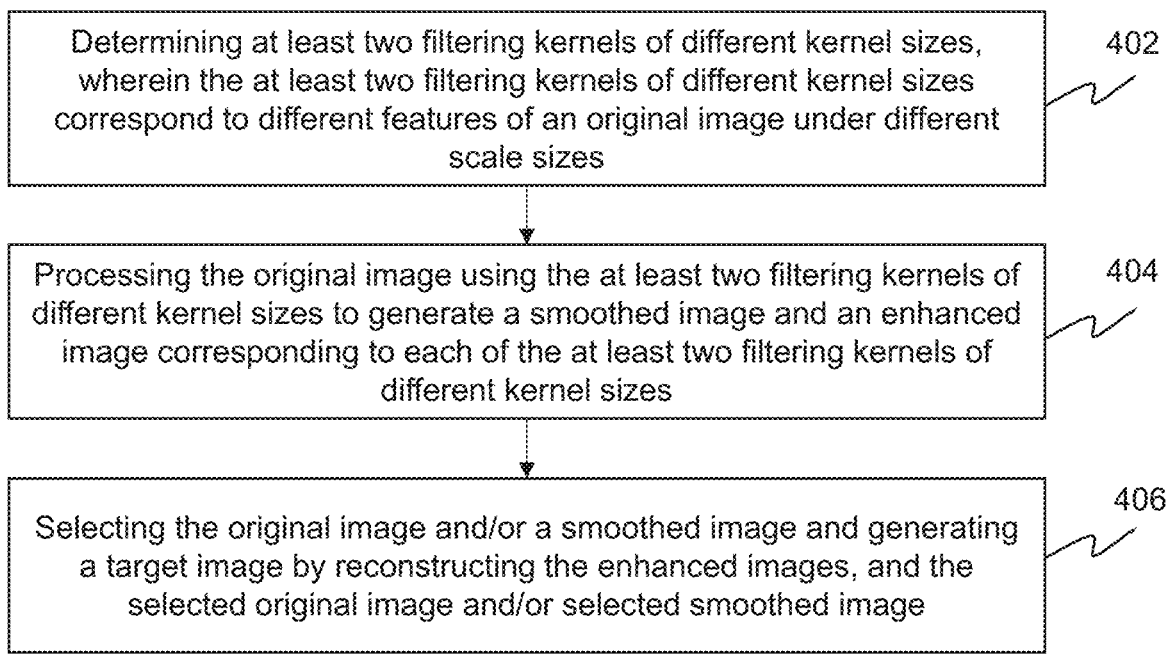
FIG. 4 is a flowchart illustrating an exemplary process for determining a target image according to some embodiments of the present disclosure.

FIG. 4 is a flowchart illustrating an exemplary process for positioning a table according to some embodiments of the present disclosure. In some embodiments, at least part of process 400 may be performed by the processing device 140 (implemented in, for example, the computing device 200 shown in FIG. 2). For example, the process 400 may be stored in a storage device (e.g., the storage device 150, the storage 220, the storage 390) in the form of instructions (e.g., an application), and invoked and/or executed by the processing device 140 (e.g., the processor 210 illustrated in FIG. 2, the CPU 340 illustrated in FIG. 3, or one or more modules in the image enhancement device 900 illustrated in FIG. 9). The operations of the illustrated process presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below is not intended to be limiting.

In 402, at least two filtering kernels of different kernel sizes may be determined, wherein the at least two filtering kernels of different kernel sizes correspond to different features of an original image under different scale sizes. The at least two filtering kernels may be determined by the processing device 140 (e.g., the filtering kernel determination module 910).

In some embodiments, in order to enhance features of interest in the original image as many as possible, it is preferable to perform an image enhancement on the original image by using filtering kernels of different kernel sizes. The more the number count of the features of interest in the original image is, the more the number count of the filtering kernels of different kernel sizes may be.

As used herein, the at least two filtering kernels of different kernel sizes may refer to filters of different kernel sizes; the image enhancement may be used to emphasize one or more features of interest in the image and enlarge differences among different objects in the image, thereby improving the image quality and enriching an amount of information. The kernel sizes of the filtering kernels may be determined based on characteristics of the features that need to be enhanced in the original image. For example, for a feature point with a relatively small region (e.g., a breast calcification point in a breast image, a bone trabecula in a bone image), a kernel size of a corresponding filtering kernel may be relatively small. For an edge feature point in the original image, a kernel size of a corresponding filtering kernel may be relatively large (relative to the smaller kernel size). The at least two filtering kernels of different kernel sizes may be a mean filtering kernel or a bilateral filtering kernel. The different features of the original image under different scale sizes refer to different detailed features in different spaces included in different high-frequency images which are obtained by filtering the original image using the at least two filtering kernels of different kernel sizes.

In 404, the original image may be processed using the at least two filtering kernels of different kernel sizes to generate a smoothed image and an enhanced image corresponding to each of the at least two filtering kernels of different kernel sizes. The original image may be processed by the processing device 140 (e.g., the image processing module 920).

Generally, a traditional image enhancement method may include a pyramid enhancement method, a filtering kernel enhancement method, an un-sharp masking enhancement method, etc. Preferably, the traditional image enhancement method may be the un-sharp masking enhancement method. According to a traditional un-sharp masking enhancement method, a filtering kernel of a single size is used to filter the original image to determine a smoothed image. After the smoothed image is determined, a difference operation (also referred to as a "subtraction operation") may be performed on the original image and the smoothed image pixel by pixel and an image enhancement may be performed to generate an enhanced image. Therefore, according to the traditional un-sharp masking enhancement method, only features under a single scale size can be enhanced. If the number count of features of interest in the original image are particularly large and different detailed features correspond to different characteristics, then the traditional un-sharp masking enhancement method cannot be used to enhance all features of interest in the original image. Based on this, according to some embodiments of the present disclosure, at least two filtering kernels of different kernel sizes may be set, un-sharp masking enhancement operations may be performed on the original image based on the at least two filtering kernels respectively, and a smoothed image and an enhanced image corresponding to each of the at least two filtering kernels of different kernel sizes may be obtained.

In 406, the original image and/or a smoothed image may be selected and a target image (also referred to as a "finally enhanced image") may be generated by reconstructing the enhanced images, and the selected original image and/or the smoothed image. The target image may be generated by the processing device 140 (e.g., the image reconstruction module 930).

Since each of the enhanced images does not include low-frequency information filtered out by a corresponding filtering kernel, a finally complete enhanced image (i.e., the target image) cannot be obtained only based on the enhanced images. In some embodiments, in order to compensate the low-frequency information which has been filtered out and to obtain the finally complete enhanced image, after the smoothed image and the enhanced image corresponding to each of the at least two filtering kernels of different kernel sizes are obtained, preferably, the target image may be generated by performing a reconstruction on the original image and all the enhanced images (or part of the enhanced images). In some embodiments, a smoothed image (or two or more smoothed images) may be selected from the smoothed images and the target image may be generated by performing a reconstruction on the selected smoothed image(s) and all the enhanced images (or part of the enhanced images). In some embodiments, the target image may be generated by performing a reconstruction on the original image, the selected smoothed image(s), and all the enhanced images (or part of the enhanced images). In this situation, the original image and the selected smoothed image(s) may be weighted based on weighting coefficients which may be default settings of the image processing system 100 or may be adjustable under different situations. As used herein, "performing a reconstruction on the smoothed image (and/or the original image) and the enhanced images" may refer to adding an intensity of each pixel in the smoothed image (and/or the original image) to that of a corresponding pixel in each of the enhanced images (or part of the enhanced images) pixel by pixel. The finally complete image may be a complete image in which features of interest in the original image are enhanced.

According to the image enhancement method in the present disclosure, an original image may be processed by using at least two filtering kernels of different kernel sizes to generate a smoothed image and an enhanced image corresponding to each of the at least two filtering kernels of different kernel sizes. Further, the original image and/or a smoothed image (or two or more smoothed images) may be selected and a target image may be generated by reconstructing all the enhanced images (or part of the enhanced images), the original image, and/or the selected smoothed image(s). According to the image enhancement method, a technical problem that only features in the original image under a single scale size can be enhanced and noises cannot be effectively suppressed can be solved. Further, a technical effect that features of interest in the original image under different scale sizes can be enhanced can be achieved and noises can be effectively suppressed.

According to the present disclosure, the operation for processing the original image using the at least two filtering kernels of different kernel sizes to generate a smoothed image and an enhanced image corresponding to each of the at least two filtering kernels of different kernel sizes may include: filtering the original image using the at least two filtering kernels of different kernel sizes to generate at least two corresponding smoothed images; performing a difference operation on the original image and each of the at least two smoothed images pixel by pixel to generate an processed image (also referred to as an "intermediate image") corresponding to each of the at least two filtering kernels; and performing an image enhancement on each processed image to generate an enhanced image corresponding to each of the at least two filtering kernels.

In some embodiment, smoothed images and enhanced images corresponding to the original image under at least two scale sizes may be obtained based on the at least two filtering kernels.

Specifically, the original image may be filtered using the at least two filtering kernels to obtain at least two smoothed images corresponding to the at least two filtering kernels respectively. Since it is intended to enhance the features of interest in the original image, after each smoothed image is obtained, a difference operation may be performed on the original image and each smoothed image pixel by pixel, that is, for each smoothed image, the smoothed image may be subtracted from the original image pixel by pixel, and an processed image corresponding to each of the at least two filtering kernels may be generated. Then, for each processed image, an image enhancement may be performed on the processed image to generate an enhanced image corresponding to each of the at least two filtering kernels. In some embodiments, the image enhancement performed on each processed image may be performed based on a linear or a non-linear curve.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the exemplary process 400. In the storing operation, the processing device 140 may store information and/or data (e.g., the original image, the enhanced images, the smoothed images) in a storage device (e.g., the storage device 150) disclosed elsewhere in the present disclosure.

Figure 5:
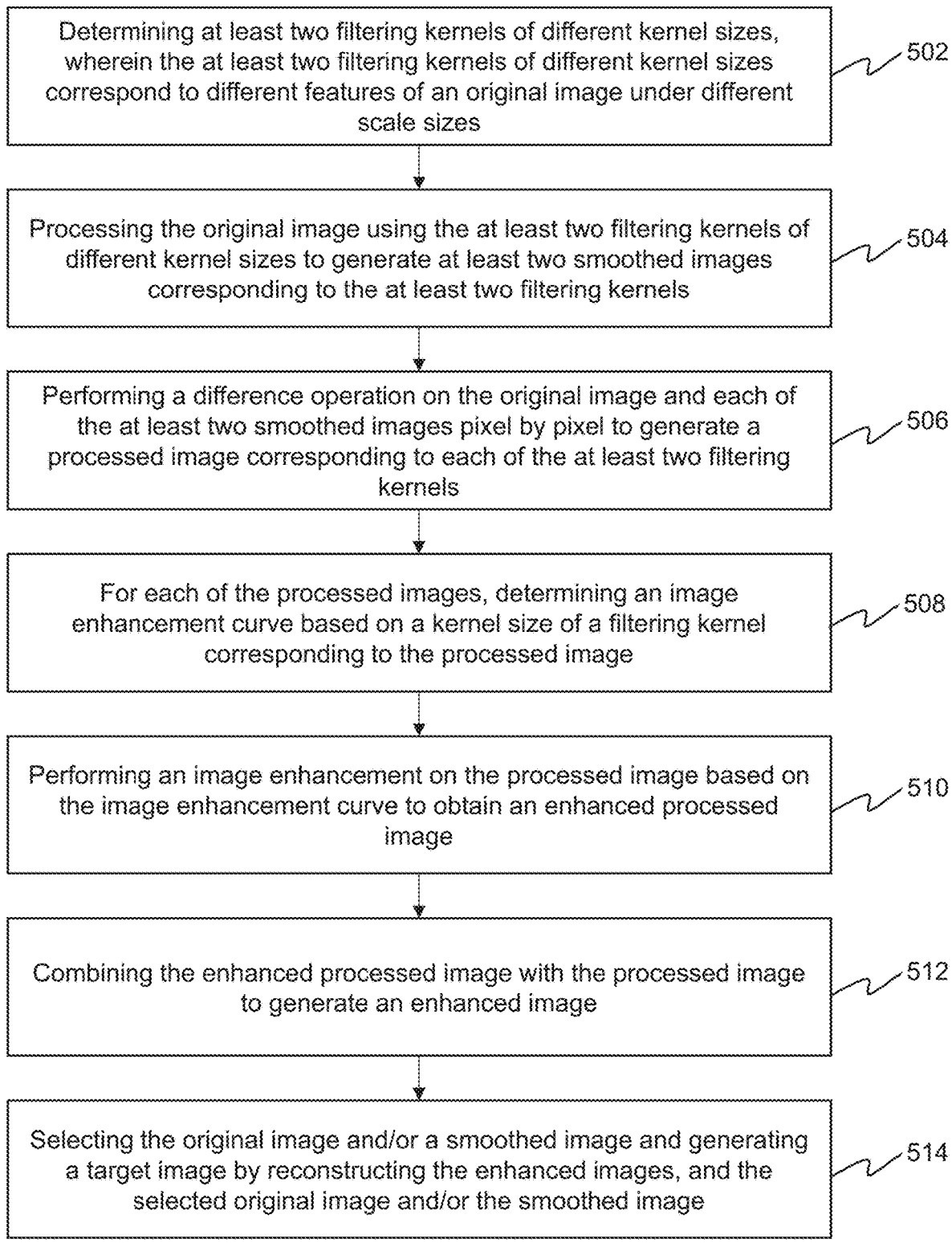
FIG. 5 is a flowchart illustrating an exemplary process for determining a target image according to some embodiments of the present disclosure.

FIG. 5 is a flowchart illustrating an exemplary process for determining a target image according to some embodiments of the present disclosure. In some embodiments, at least part of process 500 may be performed by the processing device 140 (implemented in, for example, the computing device 200 shown in FIG. 2). For example, the process 500 may be stored in a storage device (e.g., the storage device 150, the storage 220, the storage 390) in the form of instructions (e.g., an application), and invoked and/or executed by the processing device 140 (e.g., the processor 210 illustrated in FIG. 2, the CPU 340 illustrated in FIG. 3, or one or more modules in the image enhancement device 900 illustrated in FIG. 9). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 502, at least two filtering kernels of different kernel sizes may be determined, wherein the at least two filtering kernels of different kernel sizes correspond to different features of an original image under different scale sizes. The at least two filtering kernels may be obtained by the processing device 140 (e.g., the filtering kernel determination module 910).

In 504, the original image may be processed using the at least two filtering kernels of different kernel sizes to generate at least two smoothed images corresponding to the at least two filtering kernels. The original image may be processed by the processing device 140 (e.g., the image processing module 920).

In 506, a difference operation may be performed on the original image and each of the at least two smoothed images pixel by pixel to generate a processed image (also referred to as an "intermediate image") corresponding to each of the at least two filtering kernels. The difference operation may be performed by the processing device 140 (e.g., the image processing module 920). As used herein, the difference operation refers to an operation according to which an intensity of each pixel in the smoothed image is subtracted from an intensity of a corresponding pixel in the original image.

In 508, for each of the processed images, an image enhancement curve may be determined based on a kernel size of a filtering kernel corresponding to the processed image (i.e., a filtering kernel used to determine the processed image), wherein the image enhancement curve may be associated with intensities of pixels in the processed image. The image enhancement curve may be determined by the processing device 140 (e.g., the image processing module 920).

In general, if a feature point with a relatively small region is to be enhanced, a filtering kernel of a relatively small kernel size may be selected; if an edge feature point is to be enhanced, a filtering kernel of a relatively large kernel size may be selected. According to the rule, if it is intended to enhance as many features of interest as possible in the original image, it may be preferable to set three filtering kernels of three different kernel sizes, that is, a first filtering kernel, a second filtering kernel, and a third filtering kernel, of which the kernel sizes are successively increasing in turn. In this manner, not only as many features in the original image (including feature points with relatively small regions and edge feature points) as possible may be enhanced, but also a processing time in which detailed features are enhanced may be saved. It should be noted that a number count of the kernel sizes of the filtering kernels is not limited to three, any number count that is larger than or equal to two is suitable.

In some embodiments, a kernel size of a filtering kernel may be defined by a number count of pixels. In some embodiments, a range of a kernel size of a filtering kernel may be determined based on a size of the image. It is assumed that the size of the image is known, it is possible to use different percentages of the size of the image to determine the ranges of the kernel sizes of different filtering kernels. It is also possible to determine the ranges of the kernel sizes of different filtering kernels based on scale sizes of different features.

Preferably, according to some embodiments of the present disclosure, an image enhancement using three filtering kernels (of which kernel sizes are successively increasing in turn) is described as an example. The filtering kernels may be preferably square filtering kernels. It is assumed that the size of the original image is 2500 pixels×2580 pixels, according to predetermined different percentages of the size of the original image, the kernel size of the first filtering kernel may be determined as 1 pixel×1 pixel~20 pixels×20 pixels, the kernel size of the second filtering kernel may be determined as 21 pixels×21 pixels~50 pixels×50 pixels, and the kernel size of the third filtering kernel may be determined as no less than 51 pixels×51 pixels.

For feature points with relatively small regions (e.g., abreast calcification point in a breast image, a bone trabecula in a bone image), the first filtering kernel may be used to perform a filtering operation. However, the processed image (i.e., the intermediate image) determined using the first filtering kernel may include noises, therefore, in order to comprehensively consider the noises and the feature points, a selected image enhancement curve may preferably be a curve according to which an inhibition may be performed on pixels with relatively low intensities while an enhancement may be performed on pixels of which intensities reach the intensities of the feature points with relatively small regions.

Figure 6:
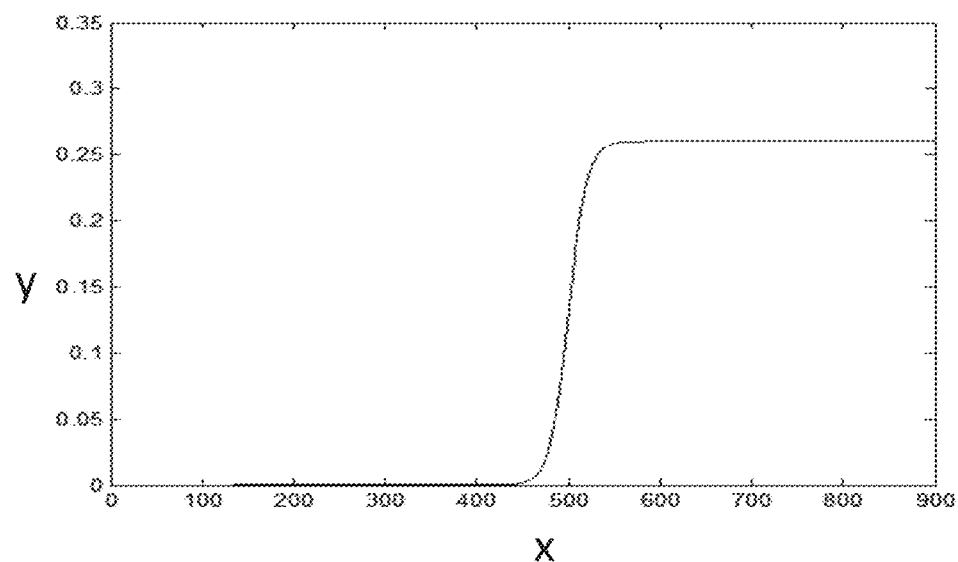
FIG. 6 is a schematic diagram illustrating an exemplary standard S curve according to some embodiments of the present disclosure.

To this end, preferably, the image enhancement curve may be a standard S curve which can expressed as an equation below:

$$y=basic_c \cdot /(1+\exp(-basic_a \times (x+basic_b))) \qquad (1)$$

where $basic_a$ refers to a slope of the standard S curve; $basic_b$ refers to an intermediate point in the rising process of the standard S curve, which is used to control an amount of translation of the curve; $basic_c$ refers to a coefficient of the standard S curve; x refers to an intensity of a pixel in the processed image; and y refers to an enhancement coefficient corresponding to the pixel. The enhancement coefficient corresponding to each pixel may be determined based on the image enhancement curve and the intensity of each pixel in the processed image. It should be noted that the image enhancement curve described above is provided for illustration purposes and not intended to be limiting. In some embodiments, the image enhancement curve may be a straight line. In some embodiments, the image enhancement curve may be any curve which can satisfy the effect of enhancing feature points with relatively small regions. The filtering kernel may preferably be a mean filtering kernel, which can be used to enhance the feature points with relatively small regions. The kernel size of the filtering kernel may preferably be 11 pixels×11 pixels, under which the enhancement effect may be optimal. For example, when the intensities of feature points with relatively small regions in the original image are higher than 500, values of $basic_a$ and $basic_c$ may preferably be 0.26 and a value of $basic_b$ may be a high frequency empirical value. In this situation, the standard S curve may be shown in FIG. 6.

For feature points with relatively large regions and with relatively unobvious edge features (e.g., a breast mass in a breast image, an outer edge of a bone in a bone image), the second filtering kernel may be used to perform a filtering operation. The second filtering kernel may be used to enhance edge features in the original image. A high-frequency part of the processed image determined using the second filtering kernel may be classified as three portions including a first portion with a relatively low intensity, a second portion with a relatively high intensity, and a third portion with a relatively mediate intensity. For the first portion, since a percentage of noises is relatively large, an inhibition is needed; for the second portion, since original details are relatively high, it is unnecessary to perform an enhancement and an inhibition is also needed; for the third portion, an enhancement is needed. Therefore, a selected image enhancement curve may preferably be a curve according to which an inhibition may be performed on pixels with relatively low and relatively high intensities and an enhancement may be performed on pixels with relatively mediate intensities.

Figure 7:
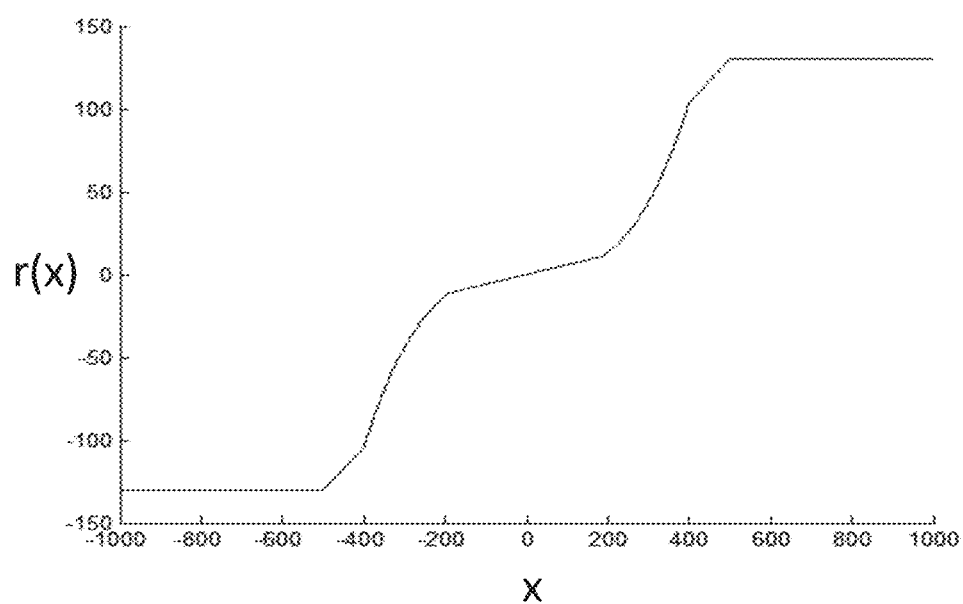
FIG. 7 is a schematic diagram illustrating an exemplary Vuylsteke non-linear curve according to some embodiments of the present disclosure.

In this situation, the image enhancement curve may preferably be a Vuylsteke non-linear curve expressed as an equation below:

$$r(x) = \begin{cases} GM\dfrac{x}{x_c}\left(\dfrac{x_c}{M}\right)^P, & |x| < x_c \\ GM\dfrac{x}{|x|}\left(\dfrac{|x|}{M}\right)^P, & x_c \leq |x| < M \\ x, & |x| \geq M \end{cases} \quad (2)$$

where x refers to an intensity of a pixel in the processed image, r(x) refers to an enhancement coefficient corresponding to the pixel, $x_c$ refers to a lower threshold associated with the intensity of the pixel, which can be used as a demarcation point between noise and signal and used to prevent the noise from being enhanced, M refers to a higher threshold associated with the intensity of the pixel, which can be used as a demarcation point between signal and high-frequency point and used to prevent portions with high contrast being over enhanced, GM refers to a parameter used to control an enhancement degree, and P is used to control a non-linearity degree of the curve, wherein the closer to 1 the value of P is, the closer to linearity the curve may be. The enhancement coefficient corresponding to each pixel may be determined based on the image enhancement curve and the intensity of each pixel in the processed image. The filtering kernel may preferably be a mean filtering kernel. The kernel size of the filtering kernel may preferably be 27 pixels×27 pixels, under which the enhancement effect may be optimal. For example, when the portion with a relatively low intensity is less than −600, the portion with a relatively high intensity is no less than 600, and the portion with a relatively mediate intensity is −190~190, a value of $x_c$ may preferably be 190, a value of M may be 400, a value of G may be 0.26, and a value of P may be 2. In this situation, the Vuylsteke nonlinear curve is shown in FIG. 7.

For feature points with relatively obvious edge features (e.g., an edge between fat and gland in a breast image, soft tissue between bone and skin in a bone image), the third filtering kernel may be used to perform a filtering operation. According to the third filtering kernel, not only the edge features can be enhanced, but also the contrast of the image can be improved. Preferably, a standard S curve with parameters according to which edge features can be enhanced may be selected as the image enhancement curve. The enhancement coefficient corresponding to each pixel may be determined based on the image enhancement curve and the intensity of each pixel in the processed image. The filtering kernel may preferably be a bilateral filtering kernel which can emphasize the edge features. The kernel size of the filtering kernel may preferably be 81 pixels×81 pixels, under which the enhancement effect may be optimal.

In 510, an image enhancement may be performed on the processed image based on the image enhancement curve to obtain an enhanced processed image (also referred to as a "processed intermediate image"). The enhanced processed image may be obtained by the processing device 140 (e.g., the image processing module 920).

In 512, the enhanced processed image may be combined with the processed image to generate an enhanced image. The enhanced image may be generated by the processing device 140 (e.g., the image processing module 920).

In some embodiments, after a respective image enhancement curve corresponding to each processed image is determined, for each processed image, an enhancement coefficient corresponding to each pixel may be determined based on an intensity of each pixel in the processed image. After a respective enhancement coefficient for each pixel is determined, the intensity of each pixel may be multiplied with the corresponding enhancement coefficient to obtain a processed image that has been enhanced based on the image enhancement curve. Finally, the original processed image may be combined with the processed image that has been enhanced to generate the enhanced image.

In 514, the original image and/or a smoothed image may be selected and a target image may be generated by reconstructing the enhanced images, and the selected original image and/or the smoothed image. The target image may be generated by the processing device 140 (e.g., the image reconstruction module 930).

On the basis of the above embodiments, according to the image enhancement method, for each processed image, a respective image enhancement curve may be determined based on a kernel size of a filtering kernel corresponding to the processed image; the processed image may be enhanced based on the image enhancement curve to obtain an enhanced processed image; and the enhanced processed image may be combined with the processed image to generate an enhanced image. According to the image enhancement method of the present disclosure, a technical problem that only features in the original image under a single scale size can be enhanced and noises cannot be effectively suppressed can be solved. Further, a technical effect that features of interest in the original image under different scale sizes can be enhanced, noises can be effectively suppressed, and features of interest under different scales sizes can be enhanced accurately can be achieved.

It should be noted that the above description of the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 500. In the storing operation, information and/or data (e.g., the original image, the smoothed images, the processed images, the enhanced images) in a storage device (e.g., the storage device 150) disclosed elsewhere in the present disclosure.

FIG. 8 is a flowchart illustrating an exemplary process for determining a target image according to some embodiments of the present disclosure. In some embodiments, at least part of process 800 may be performed by the processing device 140 (implemented in, for example, the computing device 200 shown in FIG. 2). For example, the process 800 may be stored in a storage device (e.g., the storage device 150, the storage 220, the storage 390) in the form of instructions (e.g., an application), and invoked and/or executed by the processing device 140 (e.g., the processor 210 illustrated in FIG. 2, the CPU 340 illustrated in FIG. 3, or one or more modules in the image enhancement device 900 illustrated in FIG. 9). The operations of the illustrated process presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting.

In 802, at least two filtering kernels of different kernel sizes may be determined, wherein the at least two filtering kernels of different kernel sizes correspond to different features of an original image under different scale sizes. The at least two filtering kernels may be determined by the processing device 140 (e.g., the filtering kernel determination module 910).

Preferably, in some embodiments, the filtering kernel may be any filtering kernel which can be used to smooth an image. In some embodiment, each of the at least two filtering kernels may be a mean filtering kernel or a bilateral filtering kernel. Since a bilateral filtering kernel may be used not only to enhance features of an image but also to improve a contrast of an image while a mean filtering kernel may be used to mainly enhance features of an image, the bilateral filtering kernel may be preferably used in the present disclosure. However, considering that if the bilateral filtering kernel is used, a computing amount may be relatively large, whereas if the mean filtering kernel is used, the computing amount is relatively small; and considering that a filtering kernel of a relatively small kernel size (i.e., the first filtering kernel) and a filtering kernel of a relatively mediate kernel size (i.e., the third filtering kernel) are used to focus the enhancement of the detailed features, whereas a filtering kernel of a relatively large kernel size (i.e., the second filtering kernel) is used not only to enhance edge features of the image but also to improve the contrast of the image, therefore, in order to balance the image enhancement effect and the computing amount, the filtering kernel of a relatively small kernel size (i.e., the first filtering kernel) and the filtering kernel of a relatively mediate kernel size (i.e., the third filtering kernel) may preferably be a mean filtering kernel, and the a filtering kernel of a relatively large kernel size (i.e., the second filtering kernel) may preferably be a bilateral filtering kernel.

In 804, the original image may be processed using the at least two filtering kernels of different kernel sizes to generate a smoothed image and an enhanced image corresponding to each of the at least two filtering kernels. The original image may be processed by the processing device 140 (e.g., the image processing module 920).

In 806, the kernel sizes of the at least two filtering kernels may be compared and a smoothed image corresponding to a filtering kernel of a maximum kernel size may be determined as a selected smoothed image. The selected smooth image may be determined by the processing device 140 (e.g., the image processing module 920).

In 808, a gray equalization may be performed on the selected smoothed image. The gray equalization may be performed by the processing device 140 (e.g., the image processing module 920).

In some embodiments, the selected smoothed image may be determined by comparing the kernel sizes of the at least two filtering kernels. A smoothed image corresponding to a filtering kernel of a maximum kernel size may be determined as the smoothed image, which may be used to be reconstructed with the enhanced images. After the smoothed image is selected, a gray equalization may be performed on the smoothed image according to an equation expressed as below:

$$A_1 = (1-coe) \times A + coe \times \text{Mean} \qquad (3),$$

where Mean refers to an average low frequency value, coe refers to a proportional coefficient, A refers to the selected smoothed image, and $A_1$ refers to the equalized smoothed image. In some embodiments, a value of coe may be 0~1, the larger the region of the original image is, the larger the value of coe may be. For example, the value of coe may preferably be 0.3.

In 810, a target image may be generated by reconstructing the equalized smoothed image and enhanced images. The target image may be generated by the processing device 140 (e.g., the image reconstruction module 930).

On the basis of the above embodiments, according to the image enhancement method, a gray equalization may be performed on the selected smoothed image. According to the image enhancement method of the present disclosure, a technical problem that only features in the original image under a single scale size can be enhanced and noises cannot be effectively suppressed can be solved. Further, a technical effect that features of interest in the original image under different scale sizes can be enhanced, noises can be effectively suppressed, features of interest under different scales sizes can be enhanced accurately, and a contrast of the original image can be improved can be achieved.

It should be noted that the above description of the process 800 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the exemplary process 800. In the storing operation, information and/or data (e.g., the selected smoothed image, the equalized smoothed image) may be stored in a storage device (e.g., the storage device 150) disclosed elsewhere in the present disclosure.

Figure 9:
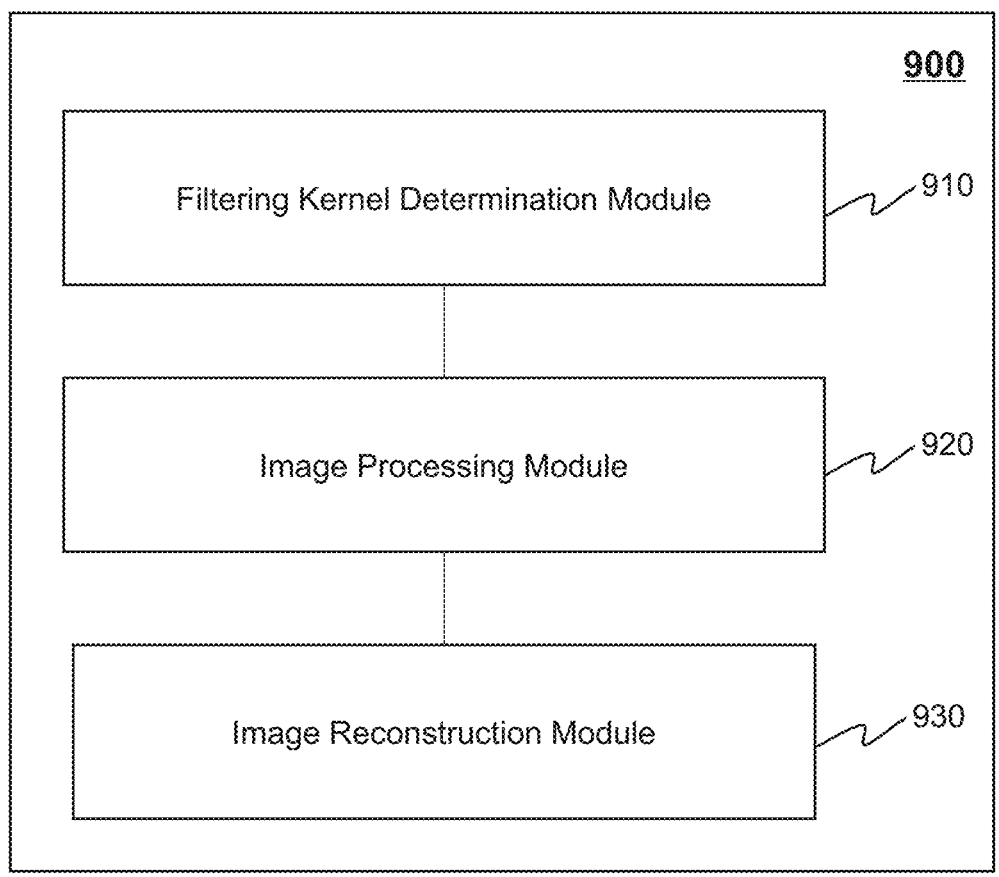
FIG. 9 is a block diagram illustrating an exemplary image enhancement device according to some embodiments of the present disclosure.

FIG. 9 is a block diagram illustrating an exemplary image enhancement device according to some embodiments of the present disclosure. The image enhancement device 900 may include a filtering kernel determination module 910, an image processing module 920, and an image reconstruction module 930. In some embodiments, the image enhancement device 900 may be integrated into the processing device 140.

The filtering kernel determination module 910 may be configured to determine at least two filtering kernels of different kernel sizes, wherein the at least two filtering kernels of different kernel sizes correspond to different features of an original image under different scale sizes.

The image processing module 920 may be configured to process the original image using the at least two filtering kernels of different kernel sizes to generate a smoothed image and an enhanced image corresponding to each of the at least two filtering kernels of different kernel sizes.

The image reconstruction module 930 may be configured to select the original image and/or a smoothed image and generate a target image by reconstructing the enhanced images, and the selected original image and/or the smoothed image.

According to the image enhancement device 900, an original image may be processed by using at least two filtering kernels of different kernel sizes to generate a smoothed image and an enhanced image corresponding to each of the at least two filtering kernels of different kernel sizes. Further, the original image and/or a smoothed image (or two or more smoothed images) may be selected and a target image may be generated by reconstructing all the enhanced images (or part of the enhanced images), the original image, and/or the selected smoothed image(s). According to the image enhancement method, a technical problem that only features in the original image under a single scale size can be enhanced and noises cannot be effectively suppressed can be solved. Further, a technical effect that features of interest in the original image under different scale sizes can be enhanced can be achieved and noises can be effectively suppressed.

In some embodiments, the image processing module 920 may include a smoothed image generation sub-module, a processed image generation sub-module, and an enhanced image generation sub-module.

The smoothed image generation sub-module may be configured to filter the original image using the at least two filtering kernels of different kernel sizes to generate at least two corresponding smoothed images.

The processed image generation sub-module may be configured to perform a difference operation on the original image and each of the smoothed image pixel by pixel to generate a processed image corresponding to each of the at least two filtering kernels.

The enhanced image generation sub-module may be configured to perform an image enhancement on each processed image to generate an enhanced image corresponding to each of the at least two filtering kernels.

In some embodiments, the enhanced image generation sub-module may include an image enhancement curve determination unit, a processed image enhancement unit, and an enhanced image generation unit.

The image enhancement curve determination unit may be configured to determine an image enhancement curve for each of the processed images based on a kernel size of a filtering kernel corresponding to the processed image, wherein the image enhancement curve may be associated with intensities of pixels in the processed image.

The processed image enhancement unit may be configured to perform an image enhancement on the processed image based on the image enhancement curve to generate an enhanced processed image.

The enhanced image generation unit may be configured to combine the enhanced processed image with the processed image to generate an enhanced image.

In some embodiments, the image reconstruction module 930 may include a smoothed image selection sub-module. The smoothed image selection sub-module may be configured to compare the kernel sizes of the at least two filtering kernels and determine a smoothed image corresponding to a filtering kernel of a maximum kernel size as the selected smooth image.

In some embodiments, the image enhancement device 900 may also include a gray equalization module. The gray equalization module may be configured to perform a gray equalization on the selected smoothed image before the enhanced images, the original image, and/or selected smoothed image are reconstructed.

The image enhancement device 900 can perform the image enhancement method described in the above embodiments, include corresponding function modules, and can achieve corresponding technical effects.

The modules in the image enhancement device 900 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units.

Figure 10:
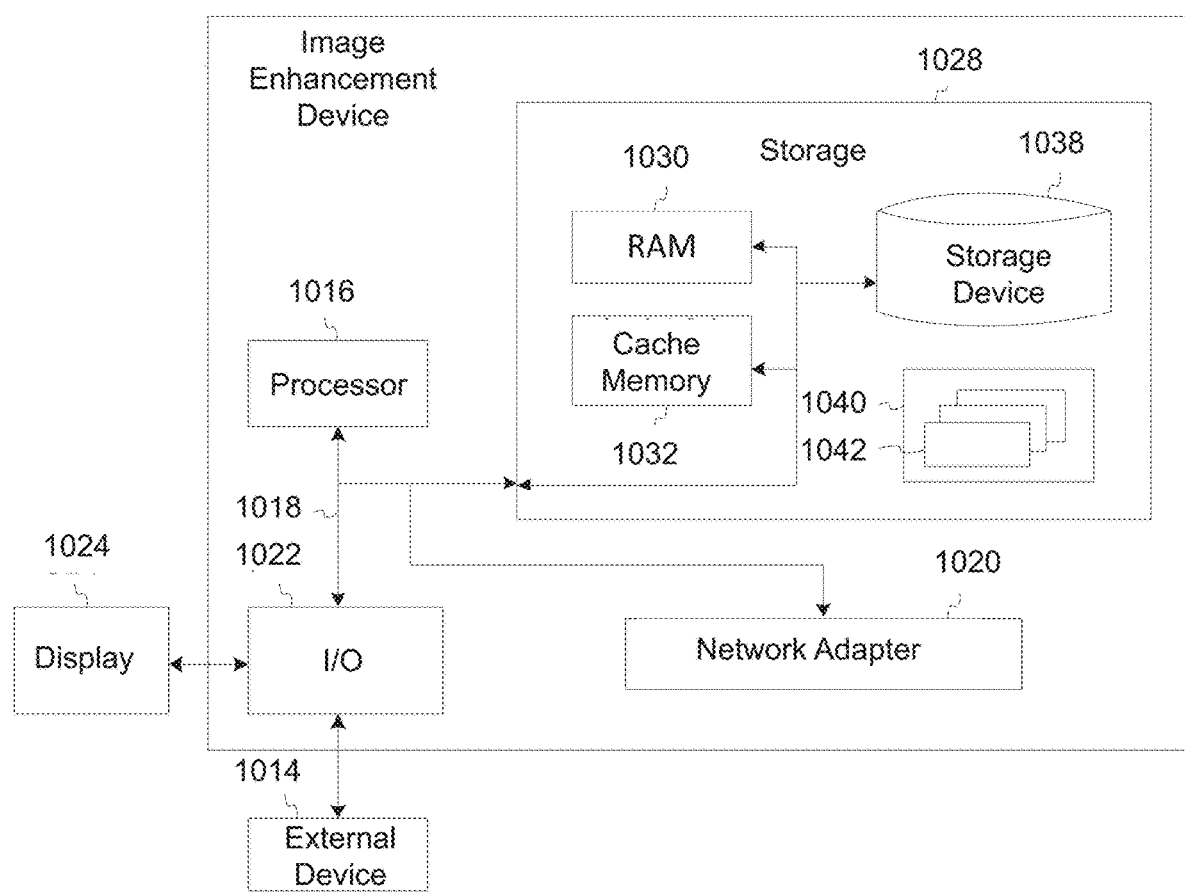
FIG. 10 is a block diagram illustrating an exemplary image enhancement device according to some embodiments of the present disclosure.

FIG. 10 is a block diagram illustrating an exemplary image enhancement device according to some embodiments of the present disclosure. As shown in FIG. 10, the image enhancement device 1000 may be represented in a form of a general computing device. The image enhancement device 1000 may include one or more processors 1016, a storage 1028, and a bus 1018 connected to different components (including the storage 1028, the processor 1016) of the image enhancement device 1000.

The bus 1018 may include one or more of bus structures of several types, for example, a storage bus or a storage controller, a peripheral bus, a graphics acceleration port, a processor, or a local bus using any of various bus structures. Exemplary bus structures may include, but not limited to, Industry Standard Architecture (ISA) bus, Micro Channel Architecture (MAC) bus, Enhanced ISA bus, Video Electronics Standards Association (VESA) local bus, Peripheral Component Interconnect (PCI) bus, or the like, or any combination thereof.

The image enhancement device 1000 may include a variety of computer system readable media. These computer system readable media may include any available medium that can be accessed by the image enhancement device 1000, including a volatile or a non-volatile medium, a removable or a non-removable medium, etc.

The storage 1028 may include a computer system readable medium in a form of a volatile storage, such as a random access storage (RAM) 1030 and/or a cache memory 1032. The image enhancement device 1000 may further include other removable/non-removable computer system storage media, volatile/non-volatile computer system storage media, etc. Merely by way of example, a storage device 1038 may be used to read and write a non-removable, non-volatile magnetic media (generally referred to as a "hard disk drive", not shown in FIG. 10). Although not shown in FIG. 10, the image enhancement device 1000 may include a disk drive used for reading and writing to removable non-volatile disks (e.g., a floppy disk) and an optical disk drive used for reading and writing to removable non-volatile discs (e.g., CD-ROM, DVD-ROM, or any other optical medium). In these situations, each drive may be connected to the bus 1018 via one or more data medium interfaces. The storage 1028 may include at least one program product including a set (e.g., at least one) of program modules configured to perform the functions of the embodiments of the present disclosure.

For example, a program/utility 1040 including a set (at least one) of program modules 1042 may be stored in the storage 1028. The program modules 1042 may include, but not limited to, an operating system, one or more applications, other program modules, and program data, wherein each or any combination thereof may include an implementation of a network environment. The program module 1042 may perform the functions and/or methods described in the present disclosure.

The image enhancement device 1000 may also communicate with one or more external devices 1014 (e.g., a keyboard, a pointing device, a display 1024, etc., wherein the display 1024 may be configured according to actual needs). The image enhancement device 1000 may also communicate with a device that enables a user to interact with the image enhancement device 1000, and/or may communicate with any device (e.g., a network card, a modem) that enables the image enhancement device 1000 to communicate with one or more other computing devices. The communication may be executed via an input/output (I/O) interface 1022. The image enhancement device 1000 may also communicate with one or more networks (e.g., a local area network (LAN), a wide area network (WAN), and/or a public network, such as the internet) via a network adapter 1020. As illustrated in FIG. 10, the network adapter 1020 may communicate with other components of the image enhancement device 1000 via the bus 1018. It should be understood that although not shown in FIG. 10, other hardware and/or software modules may be used in combination with the image enhancement device 1000, including but not limited to a microcode, a device driver, a redundant processing unit, an external disk drive array, a RAID system, a tape drive, and a data backup storage apparatus, or the like, or the combination thereof.

The processor 1016 may execute various function applications and data processing by running a program stored in the storage 1028, for example, implementing the image enhancement method provided in any of the embodiments of the present disclosure.

In some embodiments, one or more components illustrated in FIG. 10 may be implemented in at least part of the computing device 200 illustrated in FIG. 2. For example, the processor 1016 may be implemented in at least a portion of the processor 210. As another example, the storage 1028 may be implemented in at least a portion of the storage 220.

In some embodiments, the present disclosure may also provide a computer readable storage medium storing a computer program. When the computer program is executed by a processor, a process (e.g., process 400, process 500, process 800) described elsewhere in the present disclosure may be implemented.

Figure 11:
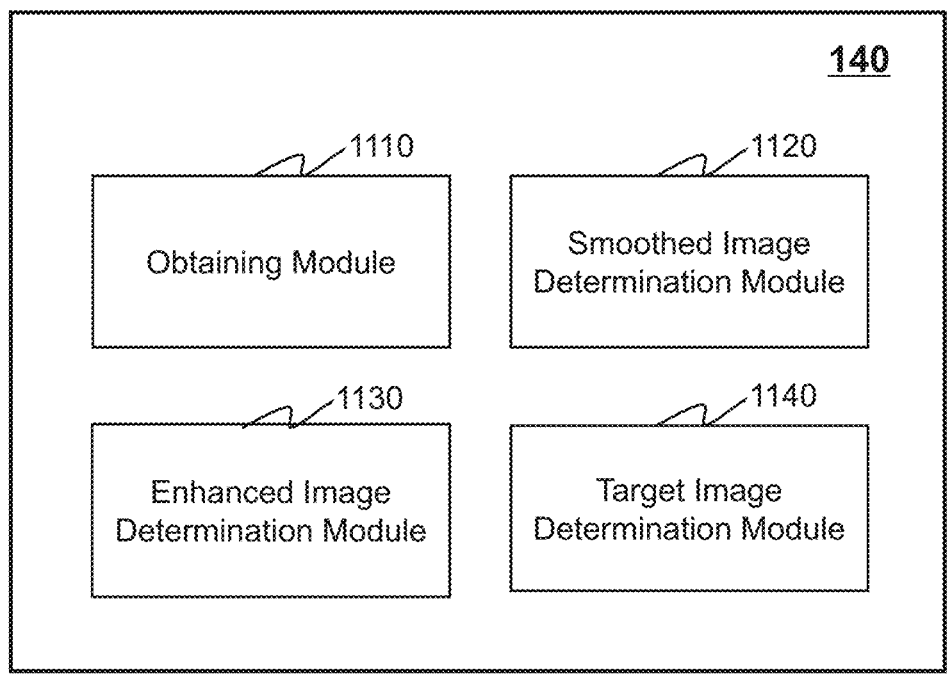
FIG. 11 is a block diagram illustrating an exemplary processing device according to some embodiments of the present disclosure.

FIG. 11 is a block diagram illustrating an exemplary processing device 140 according to some embodiments of the present disclosure. The processing device 140 may include an obtaining module 1110, a smoothed image determination module 1120, an enhanced image determination module 1130, and a target image determination module 1140.

The obtaining module 1110 may be configured to receive an original image including a plurality of pixels. The obtaining module 1110 may receive the original image from the imaging device 110 or a storage device (e.g., the storage device 150) discloses elsewhere in the present disclosure.

The smoothed image determination module 1120 may be configured to determine a plurality of smoothed images by applying a plurality of filtering kernels to the plurality of pixels of the original image, wherein each of the plurality of smoothed images corresponds to a respective one of the plurality of filtering kernels. For example, the smoothed image determination module 1120 may determine the plurality of smoothed images by performing a plurality of low-pass filtering operations on the original image based on the plurality of filtering kernels.

The enhanced image determination module 1130 may be configured to determine a plurality of enhanced images by comparing the original image with the plurality of smoothed images. For each of the plurality of smoothed images, the enhanced image determination module 1130 may determine an intermediate image (also referred to as a "processed image") by subtracting the smoothed image from the original image. The enhanced image determination module 1130 may determine a corresponding enhanced image by processing the intermediate image. Further, the enhanced image determination module 1130 may determine a corresponding enhanced image by combining the intermediate image and the processed intermediate image.

The target image determination module 1140 may be configured to generate a target image based on at least one of the plurality of enhanced images and at least one of the original image or at least one of the plurality of smoothed images. More descriptions of the target image may be found elsewhere in the present disclosure (e.g., FIG. 12 and the description thereof).

The modules in the processing device 140 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units.

Figure 12:
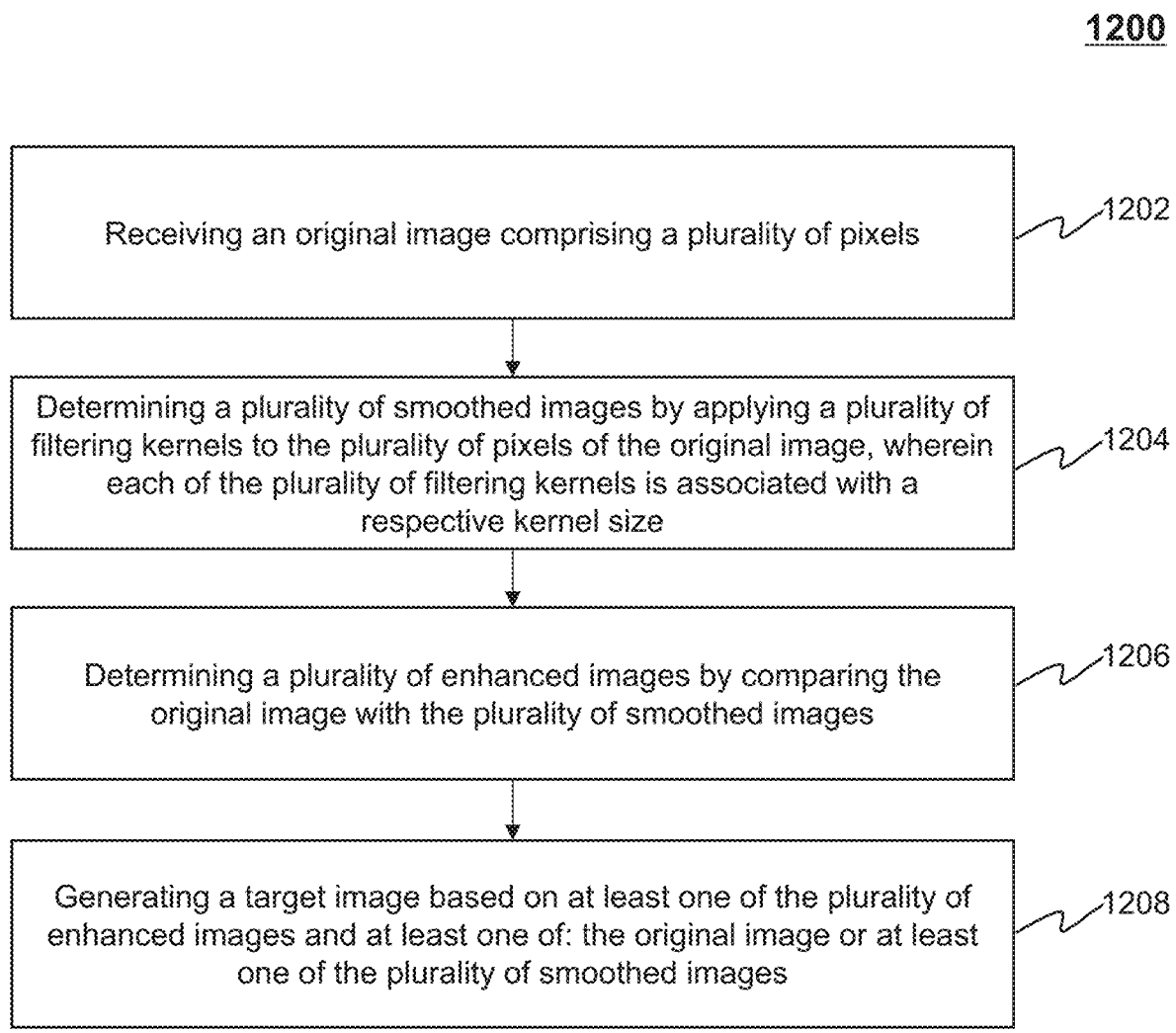
FIG. 12 is a flowchart illustrating an exemplary process for determining a target image according to some embodiments of the present disclosure.

FIG. 12 is a flowchart illustrating an exemplary process for determining a target image according to some embodiments of the present disclosure. In some embodiments, at least part of process 1200 may be performed by the processing device 140 (implemented in, for example, the computing device 200 shown in FIG. 2). For example, the process 1200 may be stored in a storage device (e.g., the storage device 150, the storage 220, the storage 390) in the form of instructions (e.g., an application), and invoked and/or executed by the processing device 140 (e.g., the processor 210 illustrated in FIG. 2, the CPU 340 illustrated in FIG. 3, or one or more modules in the processing device 140 illustrated in FIG. 11). The operations of the illustrated process presented below are intended to be illustrative. In some embodiments, the process 1200 may be accomplished with one or more additional operations not described, and/or without one or more of the operations discussed. Additionally, the order in which the operations of the process 1200 as illustrated in FIG. 12 and described below is not intended to be limiting.

In 1202, the processing device 140 (e.g., the obtaining module 1110) may receive an original image including a plurality of pixels. The processing device 140 may receive the original image from the imaging device 110 or a storage device (e.g., the storage device 150) discloses elsewhere in the present disclosure.

In some embodiments, the original image may be a two-dimensional (2D) image, a three-dimensional (3D) image, a four-dimensional (4D) image, etc. In some embodiments, a format of the original image may include a Digital Imaging and Communications in Medicine (DICOM), a tagged input file format (TIFF), a joint photographic experts group format (JPEG), a graphics interchange format (GIF), a bitmap format (BMP), or the like, or a combination thereof.

In some embodiments, as described elsewhere in the present disclosure, the image processing system 100 may be applied to various fields. Take medical field as an example, the original image may be a medical image, for example, an MRI image, a CT image, a PET image, an Electronic Portal Image Device (EPID) image, a fluoroscopy image, an ultrasound image, etc.

In 1204, the processing device 140 (e.g., the smoothed image determination module 1120) may determine a plurality of smoothed images by applying a plurality of filtering kernels to the plurality of pixels of the original image, wherein each of the plurality of smoothed images corresponds to a respective one of the plurality of filtering kernels. For example, the processing device 140 may determine the plurality of smoothed images by performing a plurality of low-pass filtering operations on the original image based on the plurality of filtering kernels.

In some embodiments, each of the plurality of filtering kernels may be associated with a respective kernel size and the kernel sizes of the plurality of filtering kernels may be different from each other. In some embodiments, as described in connection with FIGS. 4-8, each of the plurality of filtering kernels comprises a respective kernel size which may be determined based on a scale size of a respective one of a plurality of features of the original image.

In some embodiments, each of the plurality of filtering kernels may be a filtering kernel of any type. In some embodiments, as described in connection with FIG. 8, each of the plurality of filtering kernels may be one of a mean filtering kernel or a bilateral filtering kernel. The type of a filtering kernel may be determined based on the kernel size of the filtering kernel. For example, a filtering kernel of a relatively small kernel size and a filtering kernel of a relatively mediate kernel size may be a mean filtering kernel, and a filtering kernel of a relatively large kernel size may be a bilateral filtering kernel.

In 1206, the processing device 140 (e.g., the enhanced image determination module 1130) may determine a plurality of enhanced images by comparing the original image with the plurality of smoothed images.

In some embodiments, for each of the plurality of smoothed images, the processing device 140 may determine an intermediate image (also referred to as a "processed image") by subtracting the smoothed image from the original image. For example, as described in connection with FIG. 4 or FIG. 5, the processing device 140 may perform a difference operation on the original image and the smoothed image pixel by pixel to determine the intermediate image.

After determining the intermediate image, the processing device 140 may determine a corresponding enhanced image by processing the intermediate image. For example, the processing device 140 may determine an image enhancement curve (e.g., an image enhancement curve illustrated in FIG. 6 or FIG. 7) based on a filtering kernel used to determine the intermediate image and process the intermediate image based on the image enhancement curve. As described elsewhere in the present disclosure, the image enhancement curve may be associated with intensities of pixels in the intermediate image, each pixel in the intermediate image corresponds to a corresponding enhancement coefficient according to the image enhancement curve. For each pixel in the intermediate image, the processing device 140 may determine a modified intensity of the pixel by multiplying a corresponding enhancement coefficient with an original intensity of the pixel. Further, the processing device 140 may determine the corresponding enhanced image by combining the intermediate image and the processed intermediate image (also referred to as an "enhanced processed image"). For example, for a pixel pair (i.e., a pixel in the intermediate image and a corresponding pixel in the processed intermediate image), the processing device 140 may perform a weighting operation on intensities of the pixel pair based on weighting coefficients which may be default settings of the image processing system 100 or may be adjustable under different situations.

In 1208, the processing device 140 (e.g., the target image determination module 1140) may generate a target image based on at least one of the plurality of enhanced images and at least one of the original image or at least one of the plurality of smoothed images.

In some embodiments, the processing device 140 may generate the target image by performing a reconstruction on at least one of the plurality of enhanced images and the original image. Exemplary reconstruction techniques may include a pyramid reconstruction, a wavelet reconstruction, a Laplace transform reconstruction, an inverse filtering reconstruction, or the like, or any combination thereof.

In some embodiments, the processing device 140 may select a smoothed image corresponding to a filtering kernel with a maximum size and generate the target image by performing a reconstruction on at least one of the plurality of enhanced images and the selected smoothed image.

In some embodiments, the processing device 140 may generate the target image by performing a reconstruction on at least one of the plurality of enhanced images, the original image, and at least one (e.g., selected the smoothed image) of the plurality of smoothed images. In some embodiments, before performing the reconstruction, the processing device 140 may perform a weighting operation on the original image and the at least one of the plurality of smoothed images based on weighting coefficients which may be default settings of the image processing system 100 or may be adjustable under different situations.

In some embodiments, as described in connection with FIG. 8, the processing device 140 may perform a gray equalization on the at least one of the original image or the at least one of the smoothed images and perform a reconstruction on the at least one of the plurality of enhanced images and the equalized at least one of the original image or the at least one of the plurality of smoothed images.

It should be noted that the above description of the process 1200 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the exemplary process 1200. In the storing operation, information and/or data (e.g., the original image, the selected smoothed images, the enhanced images, the equalized smoothed image, the target image) may be stored in a storage device (e.g., the storage device 150) disclosed elsewhere in the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for image processing, implemented on a computing device including a processor and a storage, the method comprising:
   receiving an original image comprising a plurality of pixels;
   determining a plurality of smoothed images by performing a plurality of low-pass filtering operations on the original image based on a plurality of filtering kernels, wherein each of the plurality of filtering kernels is associated with a respective kernel size;
   determining a plurality of enhanced images by comparing the original image with the plurality of smoothed images; and
   generating a target image based on at least one of the plurality of enhanced images and at least one of: the original image or at least one of the plurality of smoothed images.

2. The method of claim 1, wherein each of the plurality of filtering kernels comprises a respective kernel size determined based on a scale size of a respective one of a plurality of features of the original image.

3. The method of claim 1, wherein each of the plurality of filtering kernels is one of a mean filtering kernel or a bilateral filtering kernel.

4. The method of claim 1, wherein the determining the plurality of enhanced images by comparing the original image with the plurality of smoothed images comprises:
   for each of the plurality of smoothed images,
      determining an intermediate image by subtracting the smoothed image from the original image; and
      determining a corresponding enhanced image by processing the intermediate image.

5. The method of claim 4, wherein the determining the corresponding enhanced image by processing the intermediate image comprises:
   determining an image enhancement curve based on a filtering kernel used to determine the intermediate image, wherein the image enhancement curve is associated with intensities of pixels in the intermediate image;
   processing the intermediate image based on the image enhancement curve; and
   determining the corresponding enhanced image by combining the intermediate image and the processed intermediate image.

6. The method of claim 1, wherein the generating the target image based on at least one of the plurality of enhanced images and at least one of the original image or at least one of the plurality of smoothed images comprises:
   selecting a smoothed image corresponding to a filtering kernel with a maximum size; and
   generating the target image based on at least one of the plurality of enhanced images and the selected smoothed image.

7. The method of claim 1, wherein the generating the target image based on the plurality of second processed images and at least one of the original image or the plurality of intermediate images comprises:
   performing a gray equalization on the at least one of the original image or the plurality of smoothed images; and
   generating the target image based on the at least one of the plurality of enhanced images and the equalized at least one of the original image or at least one of the plurality of smoothed images.

8. A system for image processing, comprising:
   a storage medium to store a set of instructions; and
   a processor, communicatively coupled to the storage medium, to execute the set of instructions to:
      receive an original image comprising a plurality of pixels;
      determine a plurality of smoothed images by performing a plurality of low-pass filtering operations on the original image based on a plurality of filtering kernels, wherein each of the plurality of filtering kernels is associated with a respective kernel size;
      determine a plurality of enhanced images by comparing the original image with the plurality of smoothed images; and
      generate a target image based on at least one of the plurality of enhanced images and at least one of: the original image or at least one of the plurality of smoothed images.

9. The system of claim 8, wherein each of the plurality of filtering kernels comprises a respective kernel size determined based on a scale size of a respective one of a plurality of features of the original image.

10. The system of claim 8, wherein each of the plurality of filtering kernels is one of a mean filtering kernel or a bilateral filtering kernel.

11. The system of claim 8, wherein to determine the plurality of enhanced images by comparing the original image with the plurality of smoothed images, the processor is to:
   for each of the plurality of smoothed images,
      determine an intermediate image by subtracting the smoothed image from the original image; and
      determine a corresponding enhanced image by processing the intermediate image.

12. The system of claim 11, wherein to determine the corresponding enhanced image by processing the intermediate image, the processor is to:
   determine an image enhancement curve based on a filtering kernel used to determine the intermediate image, wherein the image enhancement curve is associated with intensities of pixels in the intermediate image;
   process the intermediate image based on the image enhancement curve; and
   determine the corresponding enhanced image by combining the intermediate image and the processed intermediate image.

13. The system of claim 8, wherein to generate the target image based on at least one of the plurality of enhanced images and at least one of the original image or at least one of the plurality of smoothed images, the processor is to:
   select a smoothed image corresponding to a filtering kernel with a maximum size; and
   generate the target image based on at least one of the plurality of enhanced images and the selected smoothed image.

14. The system of claim 8, wherein to generate the target image based on the plurality of second processed images and at least one of the original image or the plurality of intermediate images, the processor is to:

perform a gray equalization on the at least one of the original image or at least one of the plurality of smoothed images; and generate the target image based on the at least one of the plurality of enhanced images and the equalized at least one of the original image or at least one of the plurality of smoothed images.

15. A non-transitory computer readable medium, comprising executable instructions that, when executed by at least one processor, direct the at least one processor to perform a method, the method comprising:

receiving an original image comprising a plurality of pixels;

determining a plurality of smoothed images by performing a plurality of low-pass filtering operations on the original image based on a plurality of filtering kernels, wherein each of the plurality of filtering kernels is associated with a respective kernel size;

determining a plurality of enhanced images by comparing the original image with the plurality of smoothed images; and generating a target image based on at least one of the plurality of enhanced images and at least one of: the original image or at least one of the plurality of smoothed images.

16. The non-transitory computer readable medium of claim 15, wherein each of the plurality of filtering kernels comprises a respective kernel size determined based on a scale size of a respective one of a plurality of features of the original image.

17. The non-transitory computer readable medium of claim 15, wherein the generating the target image based on at least one of the plurality of enhanced images and at least one of the original image or at least one of the plurality of smoothed images comprises:

selecting a smoothed image corresponding to a filtering kernel with a maximum size; and generating the target image based on at least one of the plurality of enhanced images and the selected smoothed image.

* * * * *